Feb. 6, 1945.   R. J. MILLER   2,368,996
FLUID COUPLING
Filed April 5, 1941   3 Sheets-Sheet 1

INVENTOR.
RAYMOND J. MILLER
BY
ATTORNEY

INVENTOR.
RAYMOND J. MILLER
BY
ATTORNEY

Patented Feb. 6, 1945

2,368,996

UNITED STATES PATENT OFFICE 2,368,996

FLUID COUPLING

Raymond J. Miller, Detroit, Mich., assignor to Hydraulic Brake Company, Detroit, Mich., a corporation of California Application April 5, 1941, Serial No. 387,096

1 Claim. (Cl. 60—54)

This invention relates to fluid couplings.

Broadly the invention comprehends a fluid coupling including an impeller, a runner associated therewith, and shrouds carried by these elements cooperating with one another to more efficiently direct circulation of the fluid in the unit.

An object of the invention is to provide a fluid coupling having a plurality of fluid circuits so arranged as to provide minimum slippage during initial operation, to the end that at the start of a dead load the movement may be smoothed out.

Another object of the invention is to provide a fluid coupling including an impeller and a runner, and compound cooperative shrouds on the impeller and runner for directing the flow of fluid in the unit in progressive circuits.

Another object of the invention is to provide a fluid coupling including an impeller, a runner associated therewith, and compound cooperative shrouds carried by the impeller and the runner graduated in size from the axis of the unit to the circumference thereof so as to provide a plurality of fluid circuits of varied lengths effective to successively complete the circulation of fluid in the respective circuits, and thereafter maintain the circulation of the fluid in the circuits in phase.

Other objects and advantages of the invention will appear from the following description taken in connection with the drawings forming a part of this specification, and in which, Fig. 1 is a vertical sectional view of a fluid coupling embodying the invention;

Figure 1:
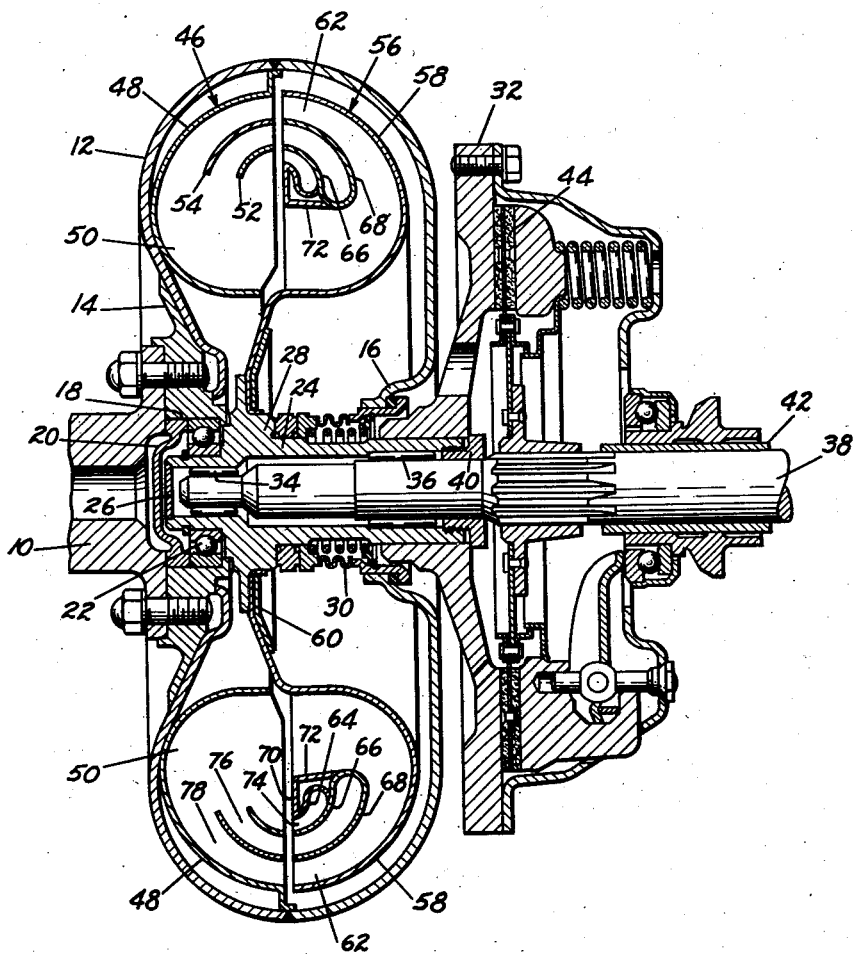
Figure 2:
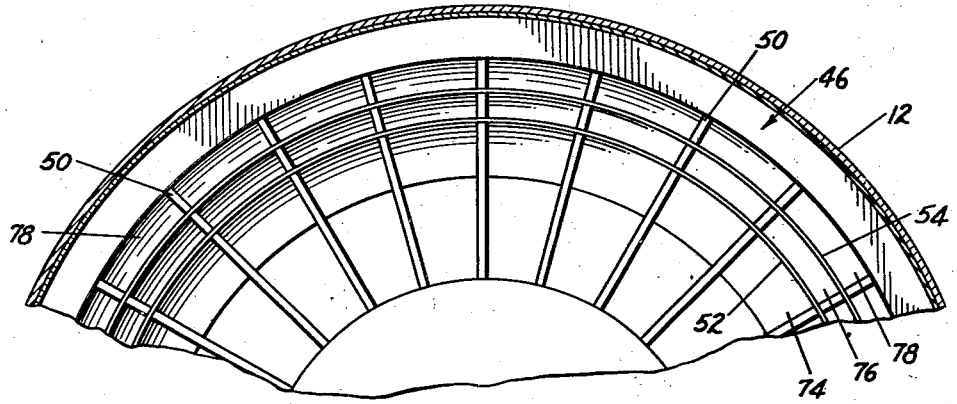
Fig. 2 is a front view of the impeller, partly broken away.
Figure 3:
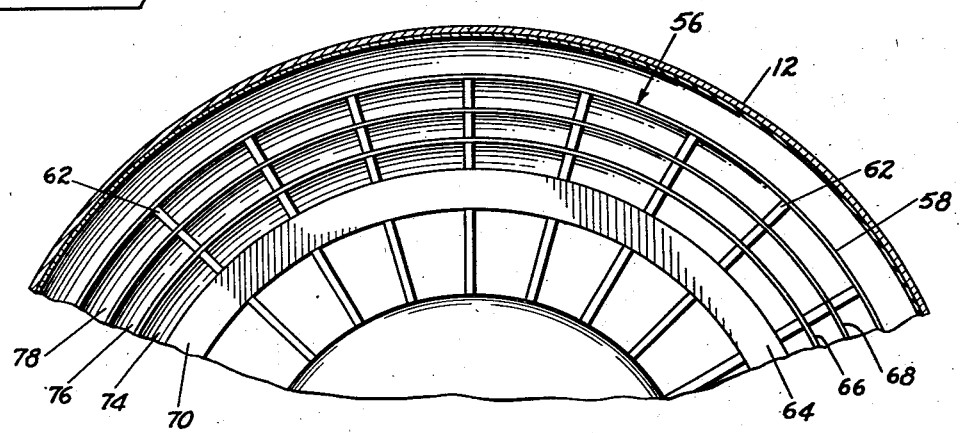
Fig. 3 is a front view of the runner, partly broken away.

Referring to the drawings for more specific details of the invention, 10 represents a driving shaft, and a housing 12 is supported on the shaft. As shown, the housing has a concentrically disposed hub 14 suitably secured to the driving shaft 10, and an oppositely disposed hub 16. The hub 14 has an axial bore 18, and supported in this bore is a closure plate 20 and a bearing 22.

A sleeve 24 supported for rotation in axial alignment with the shaft 10 has one end closed as by a plug 26, and the other end of the sleeve extends through the hub 16. The sleeve has thereon adjacent its journaled end a circumferential flange 28, and interposed between the flange and the hub 16 is a fluid seal 30 for inhibiting seepage of fluid from the housing, and splined to the end of the sleeve, extended through the hub, is a clutch member 32.

Spaced pin bearings 34 and 36 in the sleeve 24 support for rotation a driven shaft 38, and a retaining ring 40 sleeved on the driven shaft and threaded in the sleeve 24 serves to retain the clutch member 32 against displacement. The driven shaft 38 extends through a sleeve 42 on a transmission housing, not shown, and is supported on a suitable bearing, also not shown, and splined to the driven shaft is a clutch member 44 for cooperation with the clutch member 32.

An impeller, indicated generally at 46, includes an outer shroud 48 suitably secured to the inner wall of the housing 12, a plurality of spaced blades 50 mounted thereon, and shrouds 52 and 54 supported on the blades.

The shrouds 52 and 54 are arranged in substantially parallel spaced relation to one another and to the perimeter of the outer shroud 48. The shroud 52 is narrow and arcuate in cross-section. It is spaced from the center of the edge of the blades, and has a small radius, and the shroud 54 is relatively wider and also arcuate in cross-section. It is between the shroud 52 and the inner perimeter of the outer shroud 48, and thus is farther removed from the center of the edges of the blades.

A runner, indicated generally at 56, includes an outer shroud 58 secured to the flange 28 on the rotatable sleeve 24 and braced as by a heavy ring 60, and equi-spaced vanes 62 mounted on the outer shroud support inner shrouds 64, 66 and 68. The shrouds are arcuate in cross-section, and are graduated in width from approximately the center of the edges of the blades toward the inner periphery of the outer shroud. They are arranged in spaced relation to one another and to the outer shroud. The shrouds 66 and 68 are coextensive with the shrouds 52 and 54 of the impeller, and are contiguous with one another, and the shroud 64 is contiguous with the shroud 66 and with a narrow section 70 extended from its entrance edge in a plane complementary to the edges of the vanes and terminating in a deflecting section or ring 72.

The arrangement of the shrouds on the impeller and the runner is such as to provide in conjunction with one another fluid circuits 74, 76, and 78. The circuits 74 and 76 have closed or dead ends, and the circuit 78 is continuous.

Figure 4:
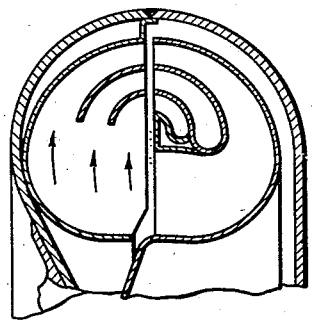
Figs. 4 to 9 are diagrammatic illustrations of the circulation of fluid in the unit.

In a normal operation, assuming that the housing 12 is filled with a suitable fluid to a predetermined degree of its capacity, upon initial rotation of the housing by force received from the shaft 10, the fluid in the housing is energized by the impeller 46 and centrifugal force resulting from rotation of the housing. These forces result in movement of the fluid in the direction indicated by the arrows in Fig. 4.

Figure 5:
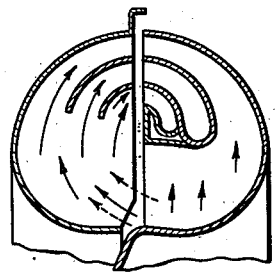

As the speed of rotation of the housing and impeller increases, the fluid is further energized and begins to move through the fluid circuits 74, 76, and 78, as indicated by the long arrows in Fig. 5, and, concomitantly therewith, fluid is beginning to move from the runner to the impeller, due to vacuum, as indicated by dotted arrows, and also the fluid in the runner is energized by centrifugal force, as indicated by short arrows.

Figure 6:
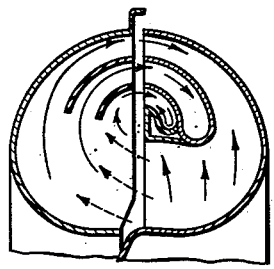

As the speed of the housing and the impeller further increases, the energy imparted to the fluid by the impeller and the centrifugal force proportionately increases, and this results in further movement of the fluid in the fluid circuits. At this stage, the fluid in the circuit 74 completes its cycle, as indicated by the arrows in Fig. 6, and the energy thereof is received by the runner. The reception of the energy by the runner is gradual, due to a small amount of slip, found very desirable at the start of a dead load, since such action tends to smooth the motion.

Figure 7:
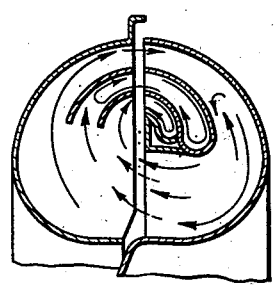

Upon further increase of speed of rotation, the fluid in the circuit 76 completes its cycle, as indicated by arrows in Fig. 7. The circulation of fluid in the circuits 74 and 76 is now in unison, and during this stage the fluid in the circuit 78 is meeting and mingling with fluid in the runner moving under the influence of centrifugal force. This results in increase of speed of rotation of the runner.

Figure 8:
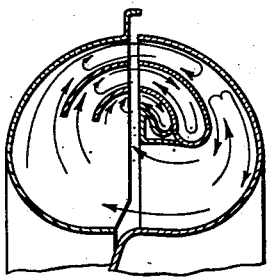
Figure 9:
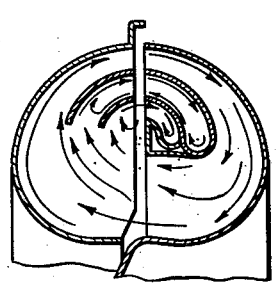

As the speed of rotation further increases, the fluid in the circuit 78 completes its cycle, and at this stage the circulation of fluid in all of the circuits is in unison, as illustrated by the arrows in Fig. 8; and, finally, at top speed, the circulation of the fluid is substantially as illustrated by the arrows in Fig. 9, wherein the circulation of the fluid is such that vortexes and parasitic drags tending to destroy efficient operation are eliminated.

While this invention has been described in connection with certain specific embodiments, the principle involved is susceptible of numerous other applications that will readily occur to persons skilled in the art. The invention is, therefore, to be limited only as indicated by the scope of the appended claim.

Having thus described the various features of the invention, what I claim as new and desire to secure by Letters Patent is—

A fluid coupling comprising a driving member and a driven member providing in conjunction with one another a vortex chamber, and a plurality of nested shrouds on each of the members, the shrouds on one member cooperating with the shrouds on the other member to provide a main power transmitting fluid circuit and a plurality of power transmitting fluid circuits nested within the main circuit the shrouds on the driving member being open to the main circuit and the cooperating shrouds on the driven member being closed to the main circuit remote from the inlets of the driven member.

RAYMOND J. MILLER.